Feb. 27, 1951     E. H. MUELLER     2,543,189
VALVE FOR CONTROLLING FUEL GAS
Filed Nov. 29, 1947
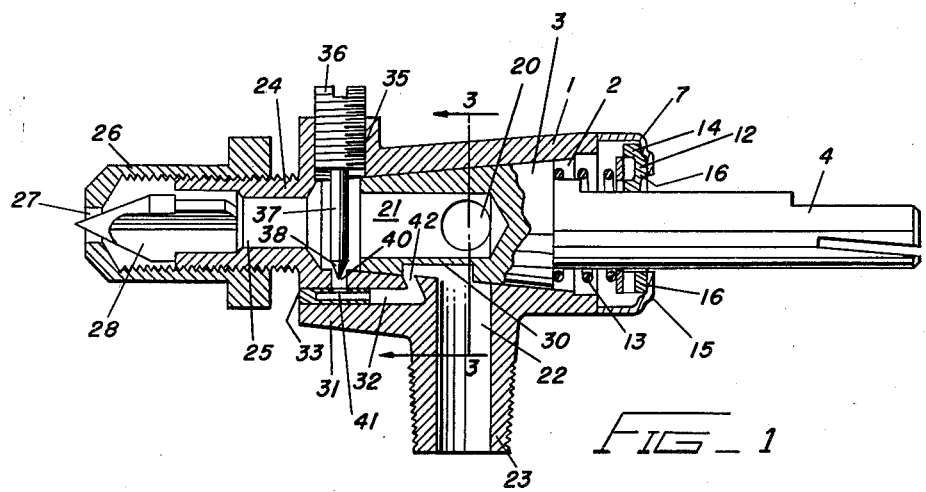
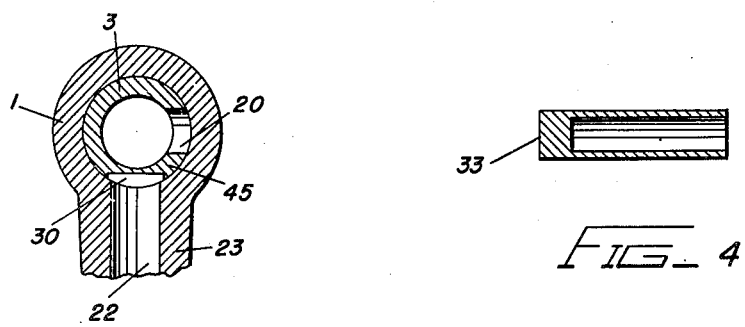
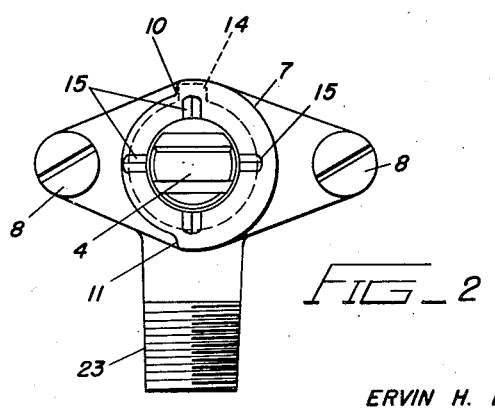
INVENTOR.
ERVIN H. MUELLER
BY
*Barnes, Kisselle, Laughlin & Raisch*
ATTORNEYS.

Patented Feb. 27, 1951

2,543,189

UNITED STATES PATENT OFFICE 2,543,189

VALVE FOR CONTROLLING FUEL GAS

Ervin H. Mueller, Grosse Pointe, Mich.

Application November 29, 1947, Serial No. 788,827

2 Claims. (Cl. 277—56)

This invention relates to a valve and it has to do particularly with a valve for controlling gas used as fuel, such for example, as in a range.

The object of the invention is to provide an improved valve construction for providing relatively large and relatively small supplies of gas to a burner, and the valve has two positions in which gas flows through the same. One position provides relatively large gas flow passageways for the flow of gas to support a relatively large flame. In the other position, the gas flow passageways are relatively small and thus a lower or simmering flame is provided at the burner. A particular object is to provide an improved construction which is simple in nature, capable of being manufactured at a low cost and yet which is of rugged construction and positive in action. The lower cost of manufacture results in the fact that the valve can be furnished to the ultimate user at a lower cost and thus the public may obtain an entirely satisfactory valve of this nature at a lower price.

A valve constructed in accordance with the invention is shown in the accompanying drawings:

Fig. 1 is a cross sectional view of a valve constructed in accordance with the invention showing the same adjusted to simmer position.

Fig. 2 is an end elevational view of the valve.

Fig. 3 is a sectional view taken substantially on line 3—3 of Fig. 1 showing the parts in simmer position.

Fig. 4 is an enlarged view of a plug member.

The valve has a body 1 with a tapered chamber 2 therein for receiving a tapered plug or valve member 3 provided with an operating stem 4 adapted to receive a handle by means of which the valve member may be turned in its tapered seat. The valve body is provided with a cap 7 which may be of formed sheet metal secured to the body by screws 8. The cap may be formed to provide a stop 10 and a stop 11 for limiting the rotary movements of the valve member. A washer 12 engages the underside of the cap, there being a spring 13 between the washer and the plug of the valve member which seats the valve member in the chamber and holds the washer against the underside of the cap. The washer has a projection 14 for engaging the stops 10 and 11. The cap may have pressed-out portions 15 forming indentations on its inner surface to receive raised parts 16 on the washer with a snapping and slight detent action to indicate a position of the valve member.

The valve member has a port 20 and a passageway 21 into which the port connects. The port is positioned so that it can be brought into and out of registry with an inlet passage 22 in the extension 23 of the valve body. The body has an outlet extension 24 which provides an outlet passage 25 communicating with the passage 21 and this extension may be threaded and provided with the usual hood 26, the orifice 27 of which may be throttled by a needle member 28.

The valve member has what may be called a slot or recess 30 in its tapered surface which may conveniently be positioned so that its center line is at about 90° from the center line of the port 20. The body is fashioned with a thickened metal portion 31 which is provided with a passageway 32. This passageway may be drilled in from the end of the body adjacent the extension 24 and then closed by a plug 33. This plug preferably has some considerable length as shown in Figs. 1 and 2, and is initially hollow in form as shown in Fig. 4.

At a position just forwardly of the inner end of the valve member 3 the body is provided with an internally threaded aperture 35 and a screw threaded metering valve member is disposed in this threaded aperture. This member is shown as having a screw threaded body 36 shaped to receive a suitable tool, such as a screw driver, with a needle-like extension 37 and a pointed end 38. A port 40 is provided at the end of the passage 30 which communicates with the outlet passage 25, this port being in line with the threaded aperture 35 so that the pointed end of the needle valve 37 may meter the port 40. The port 40 is preferably formed by passing a drill through the opening 35. In order that the plug 33 may be of a size which makes it feasible to be handled, it is formed of elongated and hollow form as shown in Fig. 4, and when the port 40 is being drilled the plug which is already in place is likewise drilled to form a port 41 therein. Also, a port 42 is provided at the opposite end of the passage 32 and which communicates with the valve chamber, this being accomplished by passing a drill angularly through the opening 35.

As mentioned above, the parts are shown in simmer position. At this time, the slot 30 registers or partially registers with the inlet 22 so that gas flows through the port 42, passage 32 and through ports 40 and 41 into the outlet passage 25. Thus, a small amount of gas flows through the valve for providing gas to support a low or simmering flame. This can be regulated by adjusting the valve member 36 so that it meters the port 40. In fact, the port 40 may be entirely closed if desired. At this time, the projection 14 on the washer abuts the shoulder 10 as shown in Fig. 2. If the valve be turned about 90° clockwise, as Fig. 3 is viewed, the slot 30 is disaligned from the inlet passage and the port 20 is registered with the inlet 22. A full supply of gas now flows through the port 20, through the passage 21 and into the outlet passage 25. This position may be indicated by the snapping of projections 16 in the recesses 15. If the valve member be turned another 90° clockwise, as Fig. 3 is viewed, both the slot 30 and the port 20 are out of register with the inlet passage and the valve is closed. At this time, the projection 14 may abut the shoulder 11.

When the valve is turned "on" the valve member is turned in the opposite direction. The first increment of movement may be about 90° which aligns port 20 with the inlet port, this position being again indicated by the snapping of the projections 16 in the recesses 15 and the valve is in full "on" position. Another increment of about 90° counter-clockwise brings the slot 30 into registry with the inlet 22 and the valve is in simmer position. The dimension circumferentially between the port 20 and the slot 30 of the section of metal 45 is preferably less than the dimension across the inlet port 22 so that when the valve is turned from full on position to simmer position, the slot 30 partially registers with the inlet 22 before the port 20 is completely out of register therewith. Therefore, the flow of simmer gas through the passage 32 starts before the full flow of gas through the port 20 ceases. Likewise in the reverse action, the port 20 begins to register with the inlet 22 before the slot 30 is out of register therewith. Accordingly, a flow of gas through the valve is never completely cut off as it is moved to and from full on and simmer positions.

A valve of this kind is commonly termed a high-low valve. When, in the claims appended hereto, it is stated that the port 20 or the slot 30 is in register with the inlet 22, such statement is to include partial registry. This explanation is offered because, as shown in Fig. 1, the slot 30 is so positioned that it does not fully register with the complete opening of the inlet 22. But it does register in the sense that it assumes an operating position with respect to the inlet for the flow of gas to a burner.

In this construction, no cap or other sealing agency is needed for the screw valve member 35. This is because the only time when gas can flow to the screw member is when the valve is turned on. This is because the valve member 3, when in off position, completely shuts off the gas from all passages in the valve.

I claim:

1. A valve, particularly for the control of fuel gas to a burner comprising, a body having a chamber therein providing a seat, said chamber having an inlet and an outlet, a valve member rotatably positioned in the chamber and engaging said seat, the valve member having a passageway and having port positioned to be brought into and out of registry with the inlet for a full flow of gas through the passageway, a passage in the body substantially paralleling the chamber and located to one side thereof, said passage having one end thereof communicating with the chamber and having its other end disposed at substantially right angles to the direction of extent of the passage and communicating with the outlet of the body, a slot in the valve member arranged to be brought into and out of registry with the inlet and the first mentioned end of the passage, and a metering valve having a portion screw threaded in the valve body and extending across the outlet substantially at a right angle to the axis of the valve member and having an end portion cooperating with the second mentioned outlet of said passage to meter the same.

2. A valve, particularly for the control of fuel gas to a burner comprising, a body having an elongated chamber with tapered interior walls forming a valve seat, said body having an inlet opening into the side of the chamber and an outlet passage opening into the small end of the chamber, a tapered valve member rotatably seated in the chamber, said valve member having an axially extending passageway, a port in the valve member opening into the passageway and positioned to be brought into and out of registry with the said inlet for a full flow of gas when the port is registered with the inlet, said body, adjacent the outlet, having a passage therein substantially paralleling the chamber and located to one side thereof, said passage having an angularly disposed end opening into the chamber and a second angularly disposed end opening into the outlet passage substantially at a right angle, the valve member having a slot in its surface arranged to be brought into and out of registry with the said inlet and the first mentioned end of said passage for the flow of a lower volume of gas through the valve, and a metering valve screw threaded in the body and having a portion extending substantially diametrically across the outlet passage and spaced from the small end of the tapered valve and having an end portion for cooperating with and metering the second named end of said passage.

ERVIN H. MUELLER.

REFERENCES CITED

The following references are of record in the file of this patent:

FOREIGN PATENTS

| Number | Country | Date |
| --- | --- | --- |
| 24,422 | Great Britain | July 26, 1904 |
| 103,809 | Germany | of 1899 |